US012644528B2

(12) United States Patent
Yeon et al.

(10) Patent No.: US 12,644,528 B2
(45) Date of Patent: Jun. 2, 2026

(54) COOLING MEDIUM DISTRIBUTION APPARATUS FOR VEHICLE

(71) Applicant: Hyundai Wia Corporation, Changwon (KR)

(72) Inventors: Je Min Yeon, Incheon (KR); Sang Min Lee, Hwaseong (KR); Woo Yeon Cho, Sejong (KR)

(73) Assignee: Hyundai Wia Corporation, Changwon (KR)

( * ) Notice: Subject to any disclaimer, the term of this patent is extended or adjusted under 35 U.S.C. 154(b) by 406 days.

(21) Appl. No.: 18/360,018

(22) Filed: Jul. 27, 2023

(65) Prior Publication Data

US 2024/0068581 A1 Feb. 29, 2024

(30) Foreign Application Priority Data

Aug. 26, 2022 (KR) ......................... 10-2022-0107698

(51) Int. Cl.
F16K 11/085 (2006.01)
F28F 27/02 (2006.01)

(52) U.S. Cl.
CPC .......... F16K 11/0856 (2013.01); F28F 27/02 (2013.01)

(58) Field of Classification Search
CPC ........................... F16K 11/0856; F16K 27/065
See application file for complete search history.

(56) References Cited

U.S. PATENT DOCUMENTS 3,251,408 A * 5/1966 Watson .................... F01K 9/003
165/104.31
5,172,725 A * 12/1992 Kitagawa ............ F16K 11/0856
137/625.43

| | | | | |
|---|---|---|---|---|
| 5,431,189 A * | 7/1995 | Jones | ...................... | F25B 45/00 |
| | | | | 137/625.42 |
| 9,345,851 B2 * | 5/2016 | Kim | ..................... | A61M 16/204 |
| 9,618,128 B2 * | 4/2017 | Dourdeville | ........... | G01N 30/20 |
| 2004/0221901 A1 * | 11/2004 | Chen | ................... | F16K 11/0853 |
| | | | | 137/625.23 |
| 2006/0118066 A1 * | 6/2006 | Martins | ............... | F16K 11/0856 |
| | | | | 123/41.08 |
| 2010/0319796 A1 * | 12/2010 | Whitaker | .............. | F16K 11/085 |
| | | | | 137/625.46 |
| 2015/0354716 A1 * | 12/2015 | Morein | ............... | F16K 11/0853 |
| | | | | 137/625.47 |
| 2017/0152957 A1 * | 6/2017 | Roche | ..................... | B60L 58/26 |

FOREIGN PATENT DOCUMENTS

KR 10-2018-0072781 A 6/2018

* cited by examiner

*Primary Examiner* — Patrick C Williams

(74) *Attorney, Agent, or Firm* — Fox Rothschild LLP

(57) ABSTRACT

A cooling medium distribution apparatus includes a valve housing with an inner space, a plurality of pass-through channels in communication with the inner space, and a plurality of distribution channels extending from the pass-through channels; a reservoir tank mounted to the valve housing and connected to the pass-through channels or the distribution channels, the reservoir tank being configured to store a cooling medium; and a valve mounted to the valve housing, the valve being configured to be rotated in order to change a distribution direction of the cooling medium. The cooling medium distribution apparatus may be installed in a vehicle to distribute the cooling medium to various cooling system parts such as the reservoir tank, a water pump, and a heat exchanger.

20 Claims, 14 Drawing Sheets

FIG. 11

COOLING MEDIUM DISTRIBUTION APPARATUS FOR VEHICLE

CROSS-REFERENCE TO RELATED APPLICATION

This application claims under 35 U.S.C. § 119(a) the benefit of Korean Patent Application No. 10-2022-0107698, filed on Aug. 26, 2022 with the Korean Intellectual Property Office, the entire contents of which are incorporated by reference herein.

BACKGROUND

1. Technical Field

The present disclosure relates to a cooling medium distribution apparatus for a vehicle, more particularly, to the cooling medium distribution apparatus capable of distributing a coolant to various cooling system parts in the vehicle.

2. Description of the Related Art

Technology continues to evolve with respect to environmentally friendly vehicles, such as an electric vehicle or a fuel cell vehicle. Environmentally friendly vehicles typically are driven using electrical energy supplied from a battery, and therefore it is necessary to develop technology for improving electric efficiency.

In connection with electric efficiency, efficiency of a battery or a driving motor is important. In a vehicle having no engine, however, thermal management is performed using electrical energy since there is no heat source.

In environmentally friendly vehicles, parts required to be thermally managed include a battery, electronic equipment, and an indoor air conditioner. It is necessary to manage the respective parts as an integrated system, rather than as independent systems, in order to positively utilize waste heat and to increase overall energy consumption efficiency of the vehicles.

When parts used to construct such an integrated thermal management system are newly adopted, it is possible to reduce space in a vehicle occupied by the integrated thermal management system and to reduce the weight of the integrated thermal management system, whereby it is possible to manufacture a more efficient vehicle.

The matters disclosed in this section are merely for enhancement of understanding of the general background of the disclosure and should not be taken as an acknowledgment or any form of suggestion that the matters form the related art already known to a person skilled in the art.

SUMMARY

The present disclosure provides a cooling medium distribution apparatus capable of being installed in a vehicle, and which has a more compact structure, e.g., by omitting a plurality of peripheral pipes and distributing a coolant to various cooling system parts.

In one aspect, a cooling medium distribution apparatus is provided that comprises (a) a valve housing comprising an inner space, a plurality of pass-through channels in communication with the inner space, and a plurality of distribution channels in communication with respective pass-through channels, the distribution channels being configured to allow a cooling medium to be distributed therethrough; (b) a reservoir tank in communication with valve housing so as to be in communication with the pass-through channels or the distribution channels, the reservoir tank being configured to store a cooling medium; and (c) a valve mounted to the valve housing, the valve being configured to provide for a change in a distribution direction of the cooling medium. In certain aspects, the distribution channels suitably may extend from respective pass-through channels. In certain embodiments a pass-through channel can be unitary (e.g., physically integrated with or part of) a distribution channel. In certain embodiments a pass-through channel may be considered distinct from a distribution channel. In a further aspect, a cooling medium distribution apparatus is provided that includes (a) a valve housing that may include a valve mounting portion having an inner space, a plurality of pass-through channels formed along the circumference of the valve mounting portion so as to communicate with the inner space, and a plurality of distribution channels extending from the respective pass-through channels, the distribution channels being configured to allow a cooling medium to be distributed therethrough; (b) a reservoir tank mounted to the valve housing e.g. in a horizontal direction so as to be connected to the pass-through channels or the distribution channels, the reservoir tank being configured to store the cooling medium; and (c) a valve mounted to the valve mounting portion of the valve housing e.g. in the horizontal direction, the valve suitably being provided in the inner space, the valve being configured to be rotated in order to change the distribution direction of the cooling medium.

A water pump suitably may be installed at the valve housing, the water pump being mounted to the valve housing in the horizontal direction.

The reservoir tank suitably may be mounted to one side of the valve housing in the horizontal direction, and the water pump may be mounted to another side of the valve housing in the horizontal direction, whereby the cooling medium may be distributed through the reservoir tank and the water pump via the valve housing.

The valve housing suitably may include the valve mounting portion having the inner space and a pump mounting portion having a mounting space, in which the water pump is provided, defined therein, the inner space of the valve mounting portion and the mounting space of the pump mounting portion being formed so as to be open in the horizontal direction.

The plurality of distribution channels of the valve housing suitably may extend such that the inner space and the mounting space communicate with each other.

The valve housing suitably may be provided with ports formed respectively at the plurality of distribution channels, each port being formed at a corresponding one of the distribution channels on the mounting space side.

The valve housing suitably may be provided with a partition configured to branch the distribution channels formed in the mounting space for each port.

The port may be formed at the valve housing so as to extend therefrom in the horizontal direction.

The port suitably may be formed at the valve housing so as to extend therefrom in a lateral direction.

The valve mounting portion suitably may be provided with a sealing portion formed at an outer circumferential surface of the valve, and the position of the sealing portion may be fixed in the state in which the sealing portion is inserted into the inner space, whereby the valve may be rotated relative to the sealing portion.

The valve mounting portion suitably may be formed in a cylindrical shape having an inner space from which the plurality of pass-through channels protrudes outwards along a side surface of the inner space, and the pass-through channels suitably may extend in a height direction of the inner space.

Each of the inner space of the valve mounting portion and the valve may be divided into a plurality of layers in the horizontal direction.

The plurality of pass-through channels may extend through the respective layers, and the plurality of pass-through channels may be connected to the reservoir tank or the respective distribution channels.

The valve may be provided with a plurality of flow channels formed for each of the layers, and the flow channels formed at one layer may be separated from the flow channels formed at another layer.

A plurality of body holes communicating with the flow channels may be formed at an outer surface of the valve, and the body holes for each layer may be offset in a circumferential direction.

A water pump may be installed at the reservoir tank, the water pump being mounted to an outer surface of a lower part of the reservoir tank.

The reservoir tank and the valve may be mounted to one side of the valve housing in the horizontal direction, and a heat exchanger may be mounted to another side of the valve housing in the horizontal direction.

The valve housing may be divided into one part and another part, the reservoir tank and the valve mounting portion may be coupled to one surface of the one part while a first distribution channel connected to the pass-through channels may be formed at another surface of the one part, and a second distribution channel matching the first distribution channel may be formed at one surface of another part while the heat exchanger may be coupled to another surface of the another part so as to communicate with the second distribution channel.

When the one part and the another part are coupled to each other, the first distribution channel and the second distribution channel may match each other, whereby a single cooling medium distribution path may be formed, and a port communicating with the cooling medium distribution path may be formed at any one of the one part and the another part.

According to the present disclosure, a vehicle may include the cooling medium distribution apparatus.

BRIEF DESCRIPTION OF THE DRAWINGS

The above and other objects, features and other advantages of the present disclosure will be more clearly understood from the following detailed description taken in conjunction with the accompanying drawings, in which:

FIG. 11 is a view showing the construction of an integrated thermal management system having the cooling medium distribution apparatus according to the embodiment of the present disclosure applied thereto;

DETAILED DESCRIPTION

Figure 1:
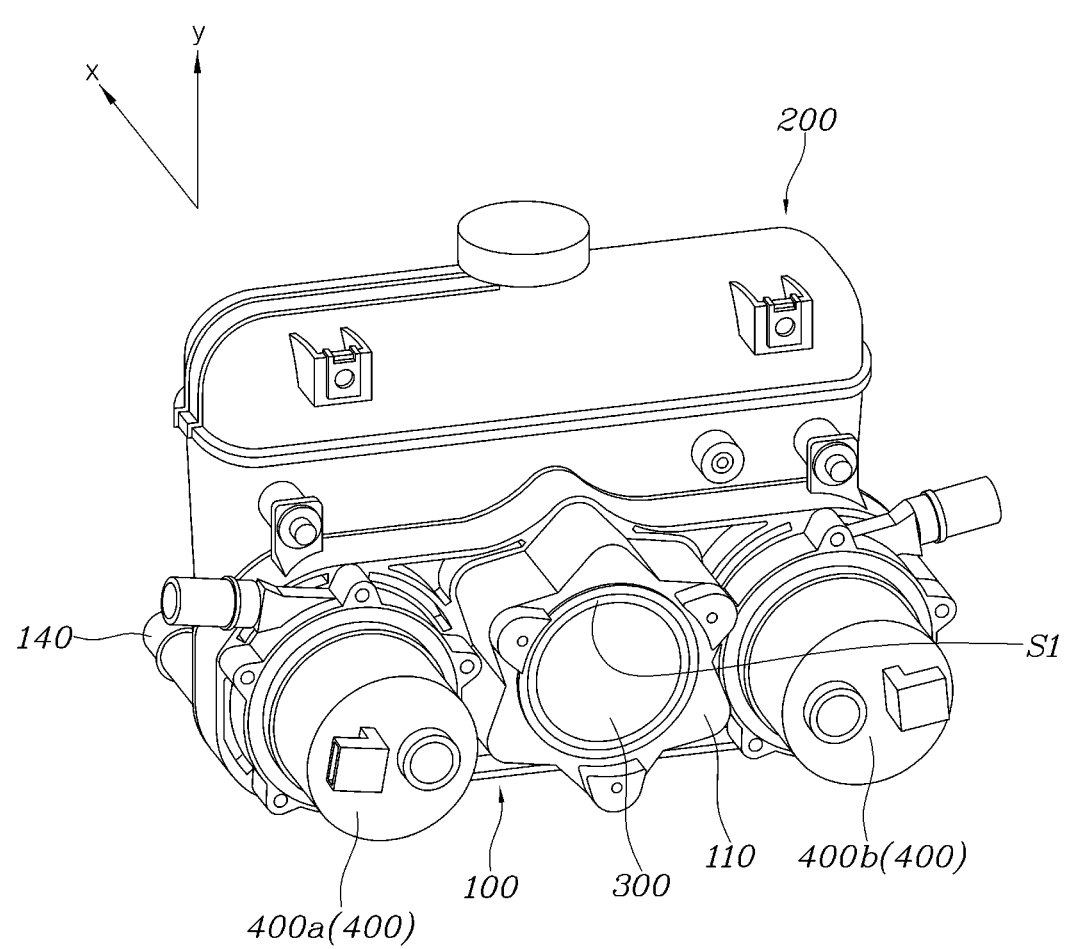
FIG. 1 is a view showing a cooling medium distribution apparatus according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Description will now be given in detail according to embodiments disclosed herein with reference to the accompanying drawings. For the sake of brief description with reference to the drawings, the same or equivalent elements may be provided with the same reference numbers, and description thereof will not be repeated.

In describing embodiments disclosed herein, a detailed description of known functions and configurations incorporated herein will be omitted when it may make the subject matter of the present disclosure rather unclear. In addition, the accompanying drawings are used to aid in ease of understanding various technical features and it should be understood that embodiments disclosed herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that, when an element is referred to as being "connected to" or "coupled to" another element, it may be directly connected to or coupled to another element, or intervening elements may be present. In contrast, when an element is referred to as being "directly connected to" or "directly coupled to" another element, there are no intervening elements present.

A singular representation may include a plural representation unless it represents a definitely different meaning from the context.

In addition, "unit" or "control unit" included in names, such as a motor control unit (MCU) and a hybrid control unit (HCU), is a term that is widely used to name a controller that controls a specific function of a vehicle, but does not mean a generic functional unit.

Hereinafter, exemplary embodiments of a cooling medium distribution apparatus according to the present disclosure will be described with reference to the accompanying drawings.

Figure 2:
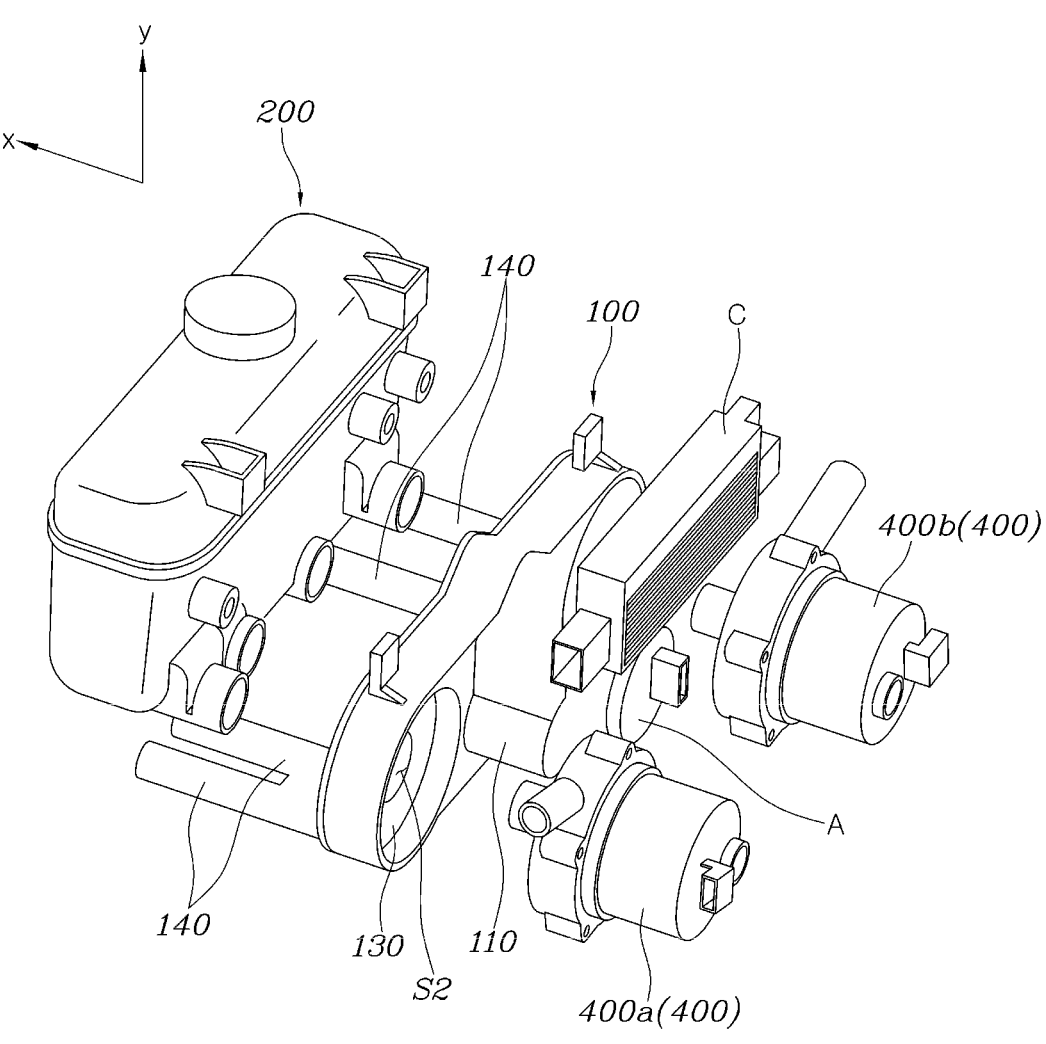
FIG. 2 is an assembled view of the cooling medium distribution apparatus according to the embodiment of the present disclosure.
Figure 3:
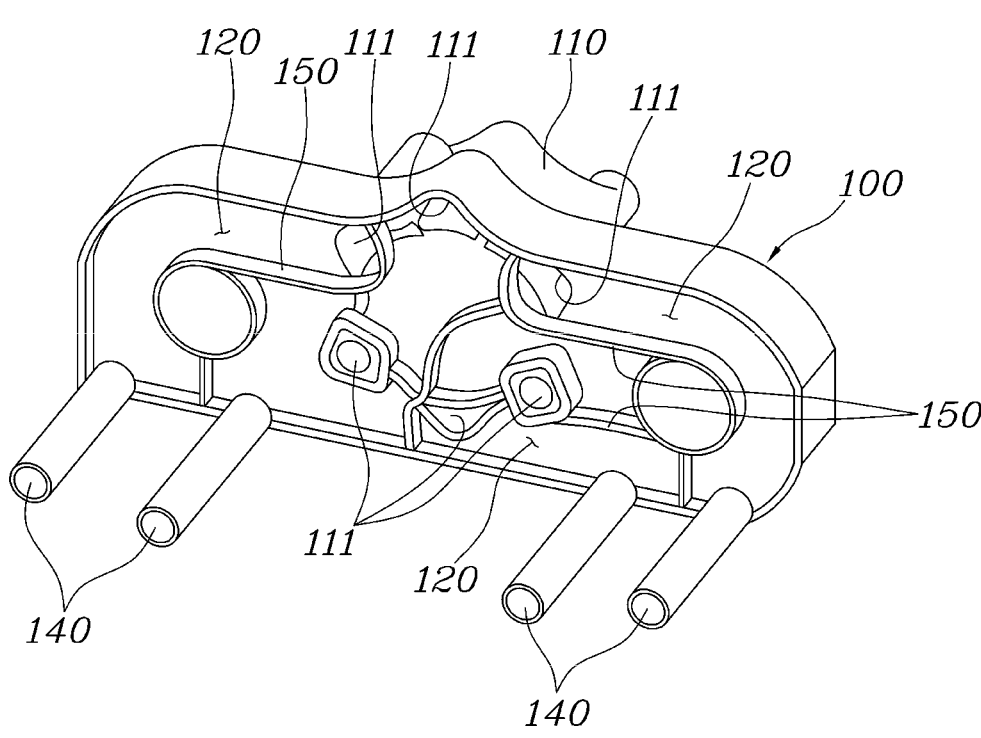
FIG. 3 is a view showing the interior of a valve housing of the cooling medium distribution apparatus according to the embodiment of the present disclosure.
Figure 4:
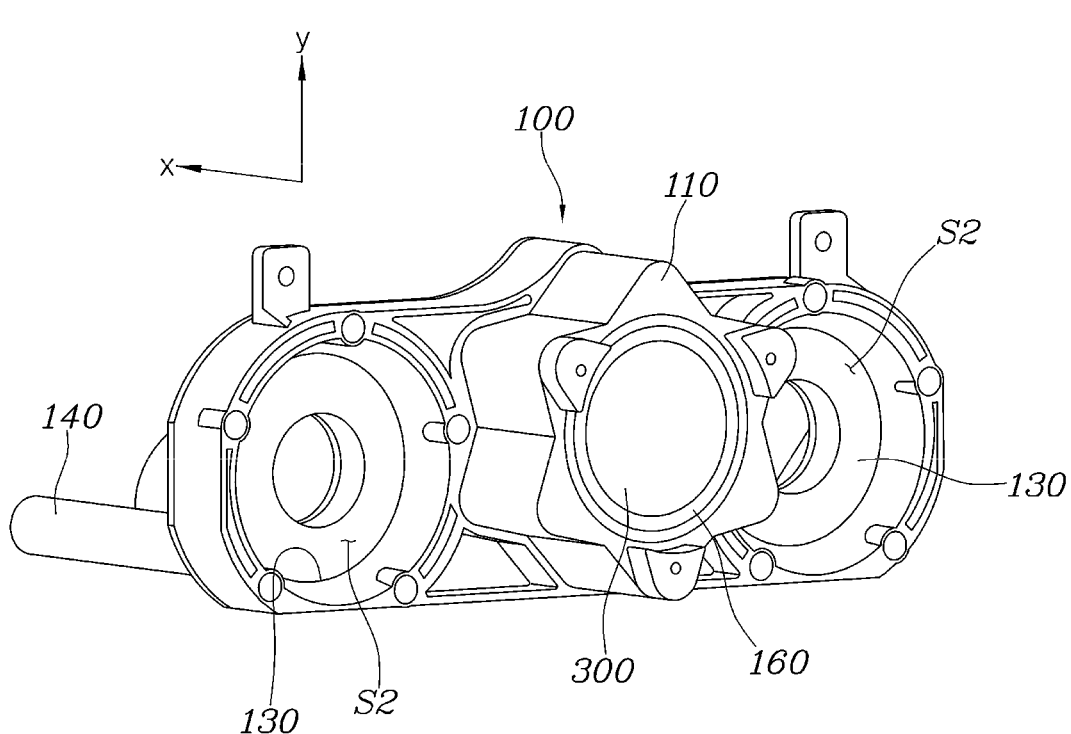
FIG. 4 is a view showing the exterior of the valve housing of the cooling medium distribution apparatus according to the embodiment of the present disclosure.
Figure 5:
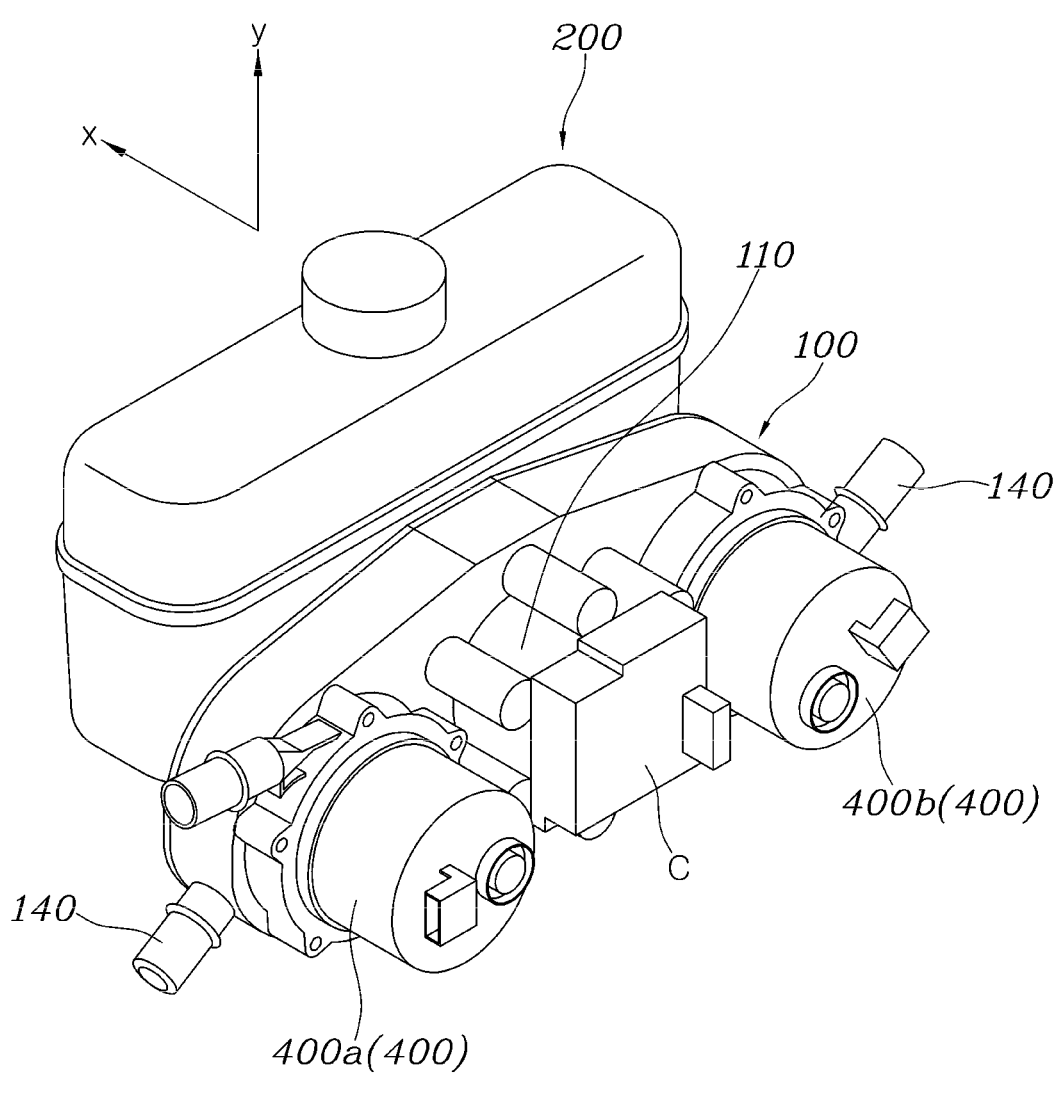
FIG. 5 is a view showing another embodiment of a port.
Figure 6:
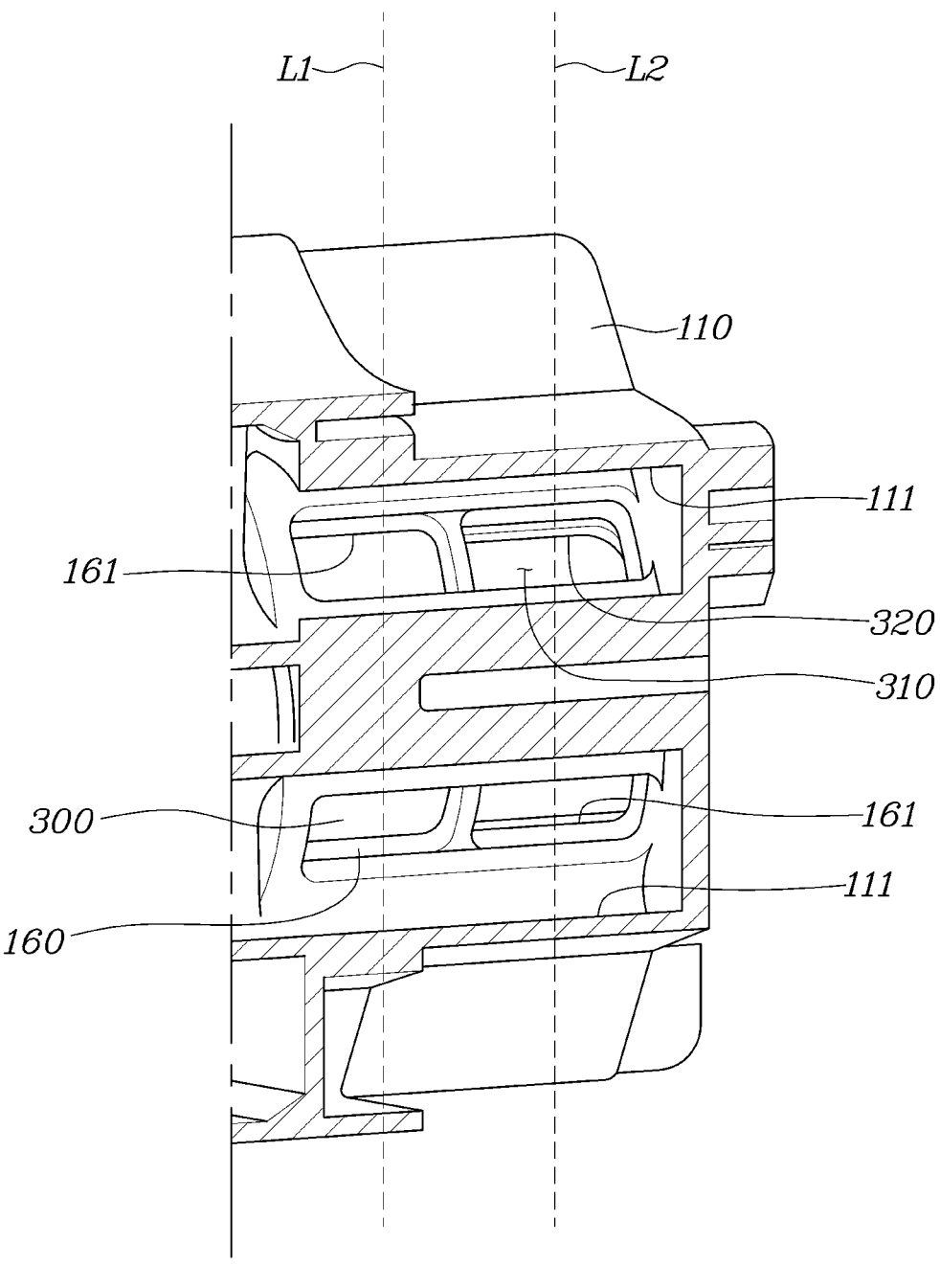
FIG. 6 is a view showing each layer of a valve mounting portion of the cooling medium distribution apparatus according to the embodiment of the present disclosure.
Figure 7:
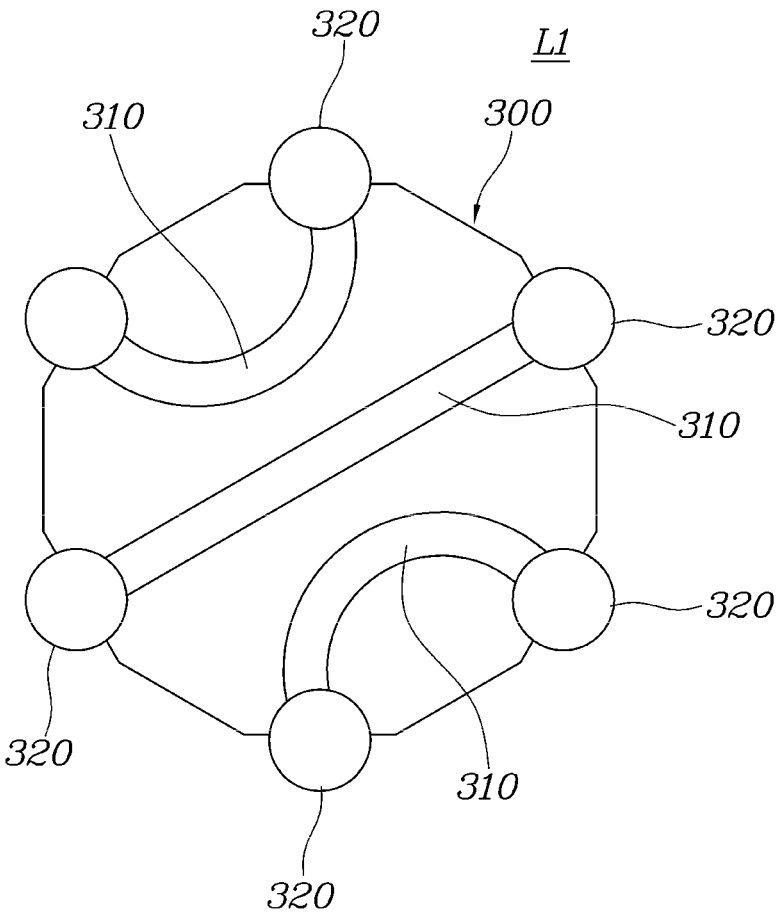
FIG. 7 is a sectional view of a first layer of a valve according to the present disclosure.
Figure 8:
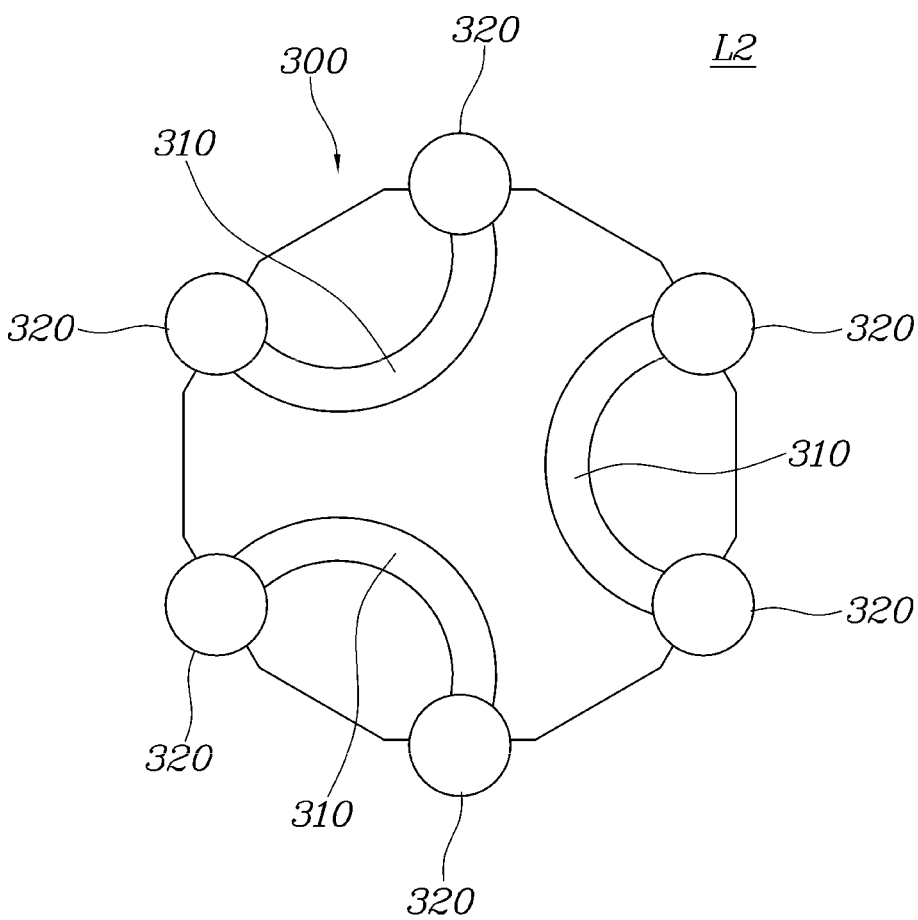
FIG. 8 is a sectional view of a second layer of the valve according to the present disclosure.

FIG. 1 is a view showing a cooling medium distribution apparatus according to an embodiment of the present disclosure, FIG. 2 is an assembled view of the cooling medium distribution apparatus according to the embodiment of the present disclosure, FIG. 3 is a view showing the interior of a valve housing of the cooling medium distribution apparatus according to the embodiment of the present disclosure, FIG. 4 is a view showing the exterior of the valve housing of the cooling medium distribution apparatus according to the embodiment of the present disclosure, FIG. 5 is a view showing another embodiment of a port, FIG. 6 is a view showing each layer of a valve mounting portion of the cooling medium distribution apparatus according to the embodiment of the present disclosure, FIG. 7 is a sectional view of a first layer of a valve according to the present disclosure, and FIG. 8 is a sectional view of a second layer of the valve according to the present disclosure.

Figure 9:
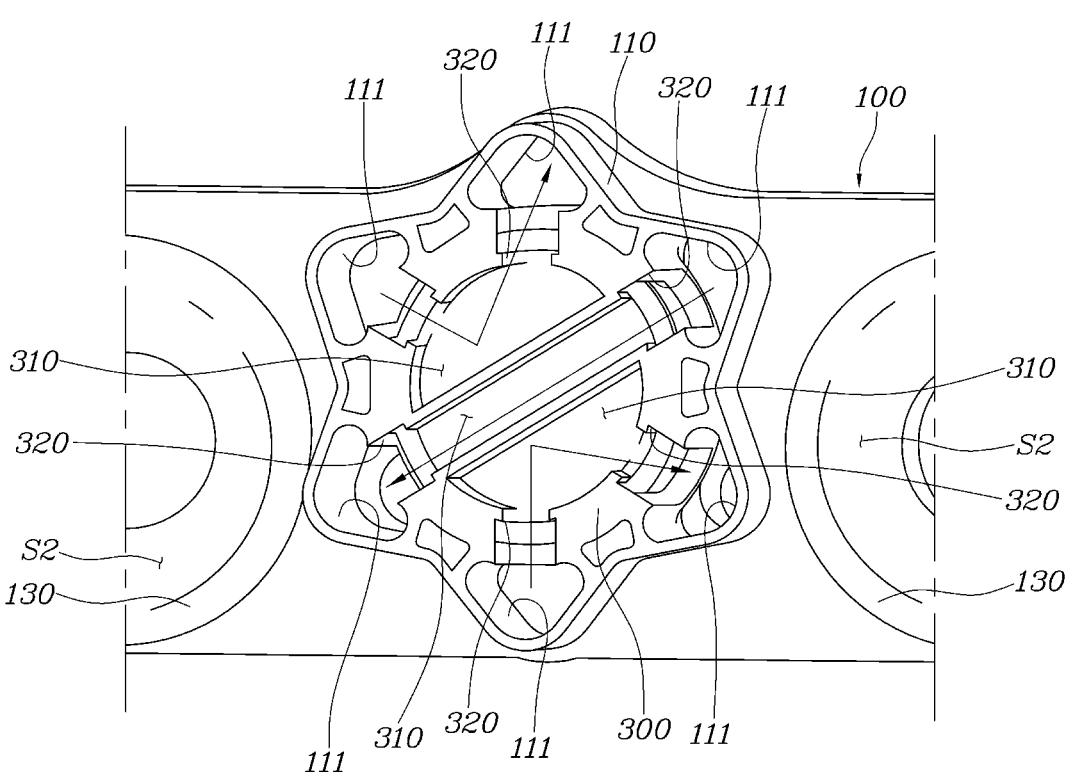
FIG. 9 is a view showing the flow of a cooling medium in the state in which the valve according to the present disclosure is rotated in accordance with an embodiment.
Figure 10:
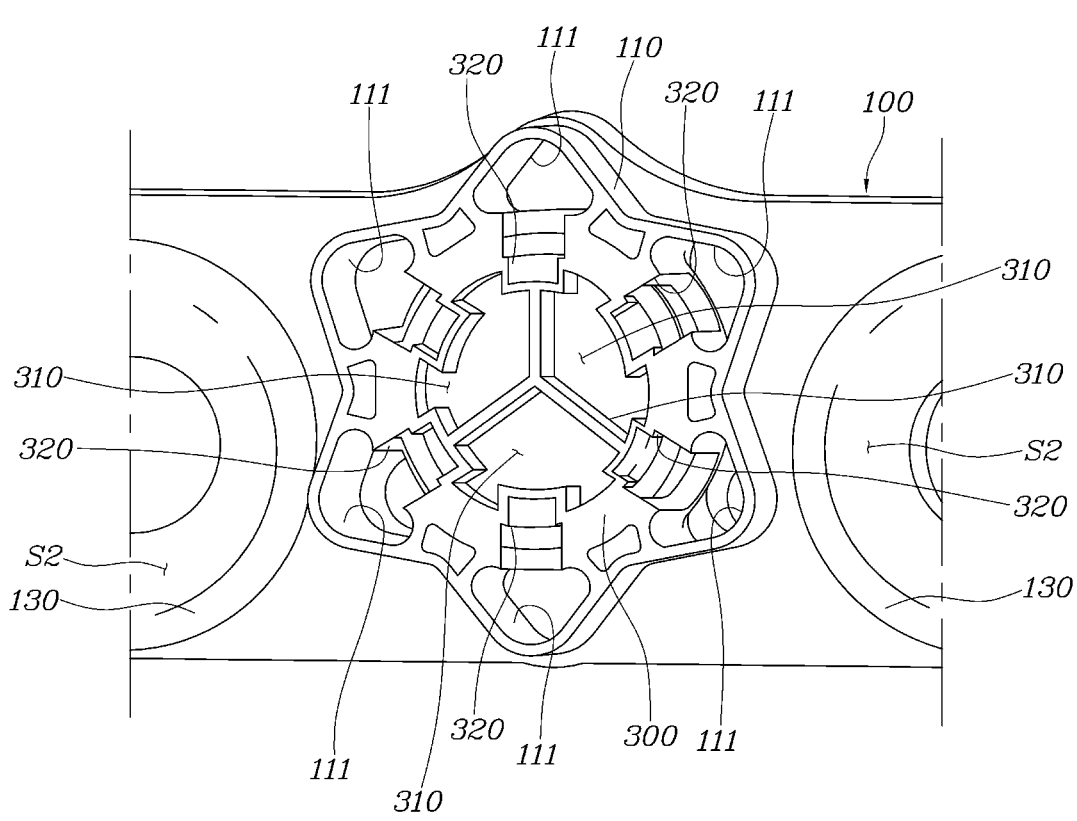
FIG. 10 is a view showing the flow of the cooling medium in the state in which the valve according to the present disclosure is rotated in accordance with another embodiment.

In addition, FIG. 9 is a view showing the flow of a cooling medium in the state in which the valve according to the present disclosure is rotated in accordance with an embodiment, and FIG. 10 is a view showing the flow of the cooling medium in the state in which the valve according to the present disclosure is rotated in accordance with another embodiment.

Figure 11:
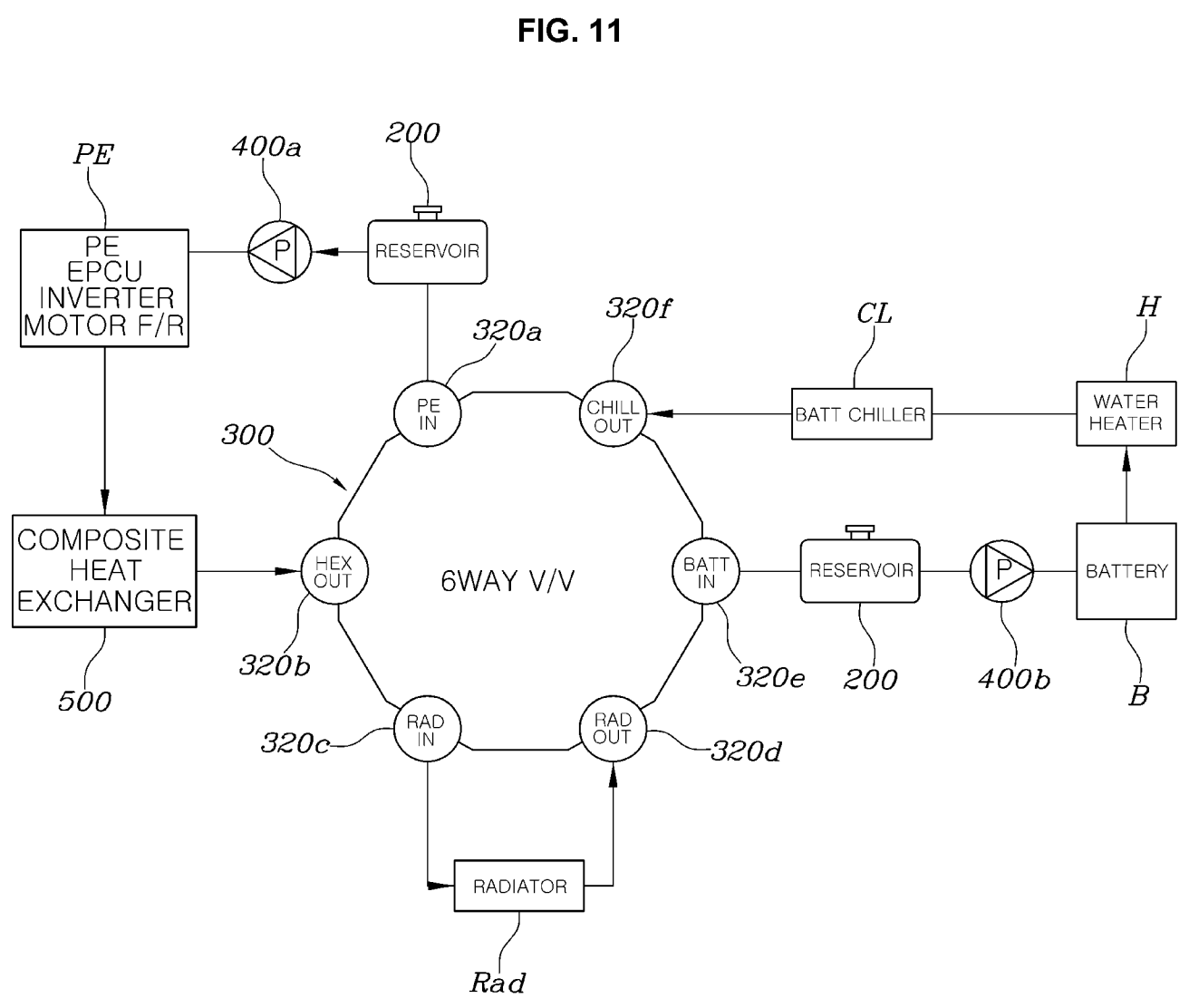

FIG. 11 is a view showing the construction of an integrated thermal management system having the cooling medium distribution apparatus according to the embodiment of the present disclosure applied thereto.

Figure 12:
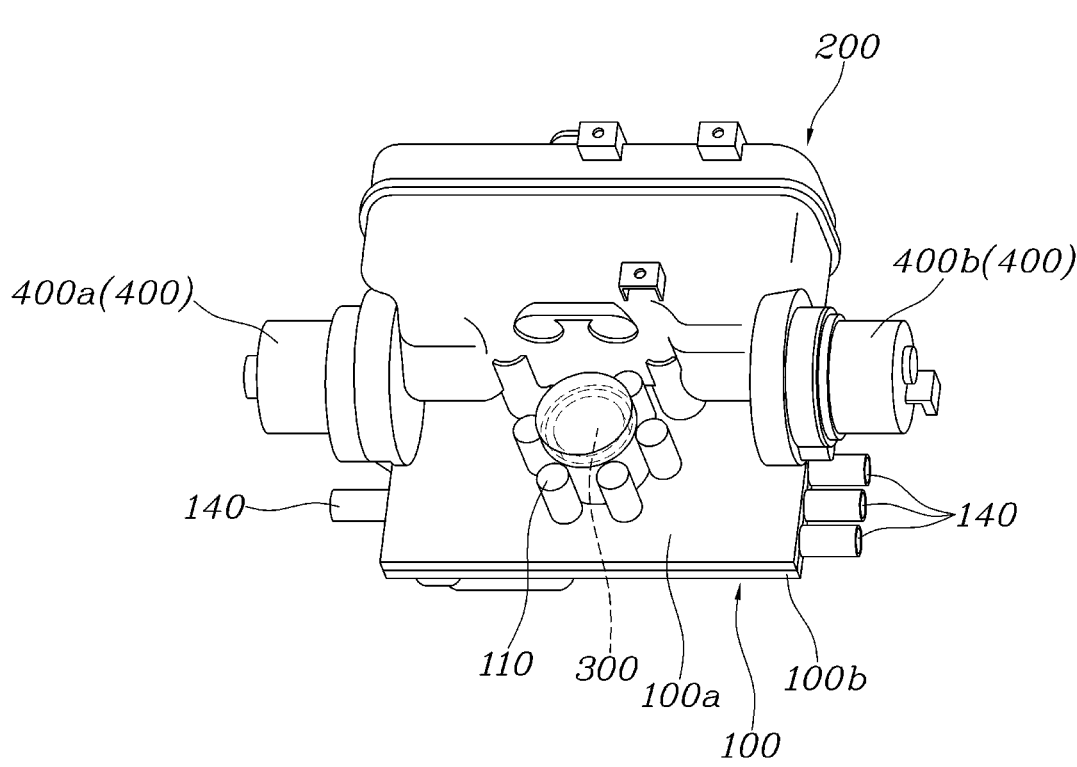
FIG. 12 is a view showing a cooling medium distribution apparatus according to another embodiment of the present disclosure.
Figure 13:
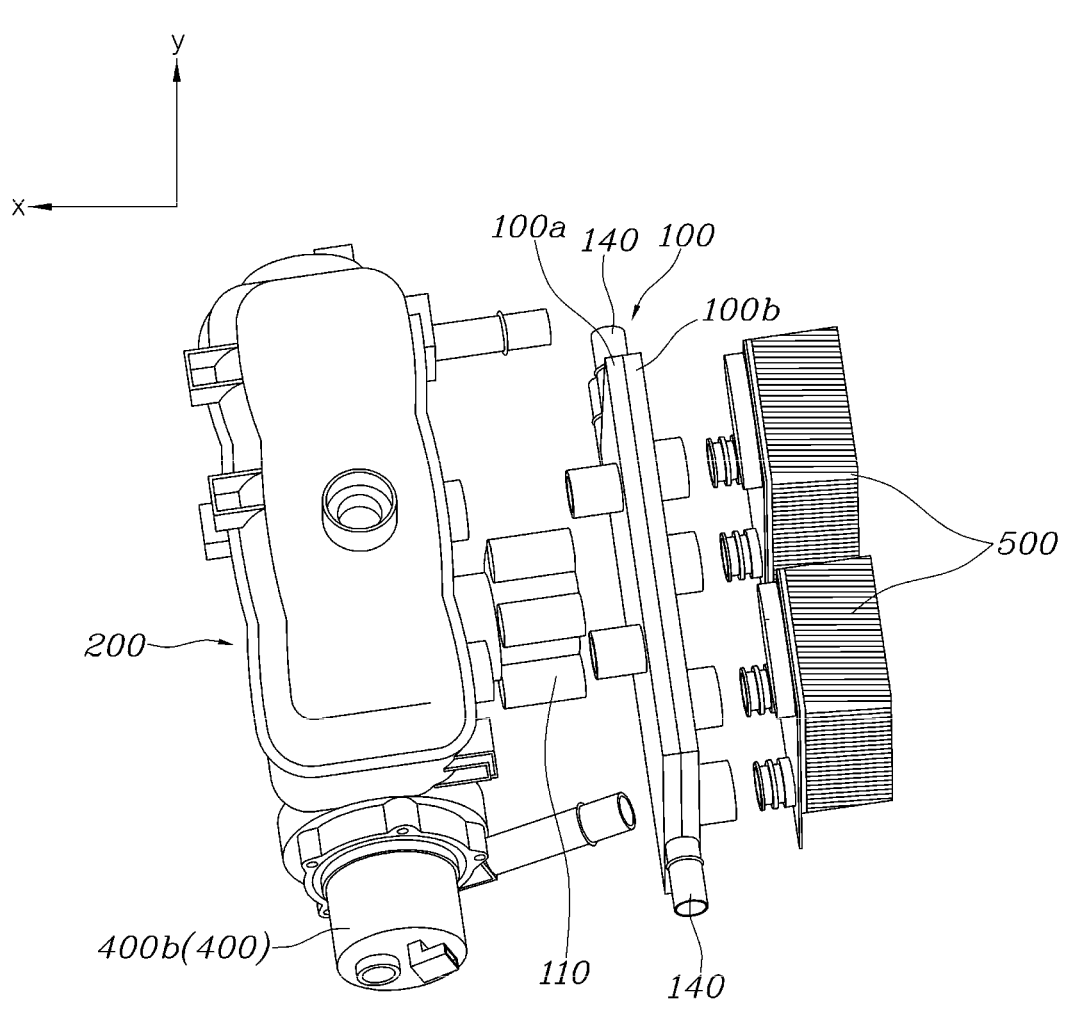
FIG. 13 is an assembled view of the cooling medium distribution apparatus according to another embodiment of the present disclosure.
Figure 14:
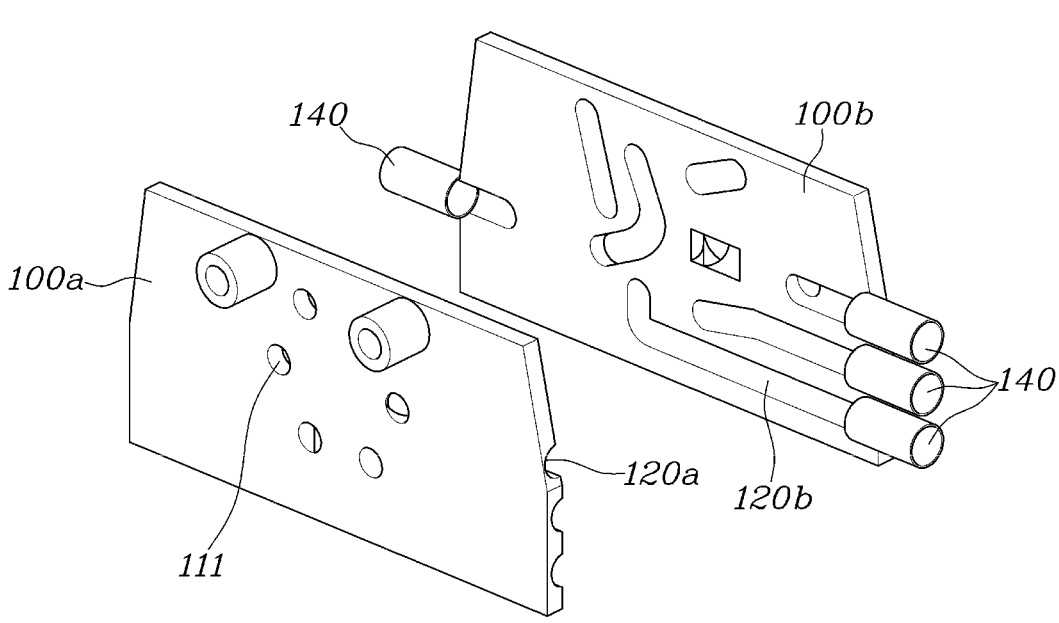
FIG. 14 is a view showing a valve housing of the cooling medium distribution apparatus according to another embodiment of the present disclosure.

Meanwhile, FIG. 12 is a view showing a cooling medium distribution apparatus according to another embodiment of the present disclosure, FIG. 13 is an assembled view of the cooling medium distribution apparatus according to another embodiment of the present disclosure, and FIG. 14 is a view showing a valve housing of the cooling medium distribution apparatus according to another embodiment of the present disclosure.

In the present disclosure, a horizontal direction is an x-axis direction in each figure, and a vertical direction is a y-axis direction in each figure.

As shown in FIGS. 1 to 4, a cooling medium distribution apparatus according to an embodiment of the present disclosure includes a valve housing 100 including a valve mounting portion 110 having an inner space S1, a plurality of pass-through channels 111 formed along the circumference of the valve mounting portion 110 so as to communicate with the inner space S1, and a plurality of distribution channels 120 extending from the respective pass-through channels 111, the distribution channels being configured to allow a cooling medium to be distributed therethrough, a reservoir tank 200 mounted to the valve housing 100 in the horizontal direction so as to be connected to the pass-through channels 111 or the distribution channels 120, the reservoir tank being configured to store the cooling medium, and a valve 300 mounted to the valve mounting portion 110 of the valve housing 100 in the horizontal direction, the valve being provided in the inner space S1 and being configured to be rotated in order to change the distribution direction of the cooling medium.

The valve housing 100 of the present disclosure includes the valve mounting portion 110 having the inner space S1, and the valve 300 is rotatably provided at the valve mounting portion 110. In addition, an actuator A may be mounted to the valve mounting portion 110 together with the valve 300. The inner space of the valve mounting portion 110 may be closed by the actuator A. The actuator A may be controlled by a control unit C. The control unit C may be mounted at the reservoir tank 200.

Here, the plurality of pass-through channels 111 is formed along the circumference of the valve mounting portion 110, and the pass-through channels 111 are connected respectively to the distribution channels 120 formed in the valve housing 100. Consequently, the cooling medium is distributed through a specific one of the pass-through channels 111 and a specific one of the distribution channels 120 depending on the rotational position of the valve 300.

In particular, the valve mounting portion 110 is formed in a cylindrical shape having the inner space S1 from which the plurality of pass-through channels 111 protrudes outwards along a side surface of the inner space S1, and the pass-through channels 111 extend in a height direction of the inner space.

That is, when the valve 300 is inserted into the inner space S1 of the valve mounting portion 110, the plurality of pass-through channels 111 is formed around the valve 300, whereby the outer circumferential surface of the valve mounting portion 110 may protrude due to the pass-through channels 111. That is, the valve 300 is provided in the center of the valve mounting portion 110, and the pass-through channels 111 are formed around the valve 300, whereby the cooling medium may be distributed through the pass-through channel 111 selected depending on the rotational position of the valve 300.

A port 140 is formed in each distribution channel 120 of the valve housing 100, whereby the cooling medium may be distributed to a part necessary to be cooled through the port 140.

In particular, the reservoir tank 200 and the valve 300 are mounted to the valve housing 100 of the present disclosure in the horizontal direction. That is, the reservoir tank 200 and the valve 300 are mounted around the valve housing 100 in the horizontal direction, whereby mounting and management of the reservoir tank 200 and the valve 300 are simplified.

In addition, as the reservoir tank 200 is mounted to the valve housing 100, the cooling medium always passes through the reservoir tank 200, whereby efficiency in removal of air from the cooling medium is improved. The reservoir tank 200 may be partitioned so as to correspond to parts necessary to be cooled (e.g., a battery or an electrical part), and may have a water level sensor mounted therein in order to check the capacity of the cooling medium. In addition, when the interior of the reservoir tank 200 is partitioned into a plurality of spaces, the spaces may be individually connected to the respective pass-through channels 111 of the valve housing 100.

Meanwhile, a water pump 400 is installed at the valve housing 100, and the water pump 400 may be mounted to the valve housing 100 in the horizontal direction. The water pump 400 may include a first water pump 400a and a second water pump 400b, which may be mounted to opposite sides of the valve mounting portion 110. As the water pump 400 includes a plurality of water pumps, it is possible to secure the distribution rate of the cooling medium and to selectively distribute the cooling medium according to the thermal management mode.

In the present disclosure, the water pump 400 is also mounted to the valve housing 100 in the horizontal direction, whereby convenience in mounting of the water pump 400 together with the reservoir tank 200 and the valve 300 is secured. When mounted to the valve housing 100, the water pump 400 is connected to any one of the plurality of pass-through channels 111, whereby the cooling medium is distributed to the distribution channel 120 via the reservoir tank 200, the valve 300, and the pass-through channel 111. Here, the water pump 400 is connected to the reservoir tank 200 via the pass-through channel 111, whereby the cooling medium passing through the reservoir tank 200 is distributed during operation of the water pump 400.

In addition, the water pump 400 is disposed at the lowermost end of the reservoir tank 200 via the valve housing 100, whereby the cooling medium introduced through the water pump 400 is immersed in the cooling medium received in the reservoir tank 200, and therefore damage to the water pump 400 due to introduction of air may be prevented.

As described above, the reservoir tank 200 is mounted to one side of the valve housing 100 in the horizontal direction, and the valve 300 and the water pump 400 are mounted to another side of the valve housing 100 in the horizontal direction, whereby the cooling medium may be distributed through the reservoir tank 200 and the water pump 400 via the valve housing 100. That is, the reservoir tank 200, the size of which is relatively large, is independently provided at one side of the valve housing 100, and the valve 300 and the water pump 400, the size of each of which is relatively small, are provided at the another side of the valve housing 100, whereby interference between the parts may be prevented, installation positions may be optimized, and the entire package may be reduced.

Specifically, the valve housing 100 includes the valve mounting portion 110 having the inner space S1 and a pump mounting portion 130 having a mounting space S2, in which the water pump 400 is provided, defined therein. The inner space S1 of the valve mounting portion 110 and the mounting space S2 of the pump mounting portion 130 may be formed so as to be open in the horizontal direction.

In the embodiment of the present disclosure, a 6-way valve is provided by way of example. One valve 300 may be provided, and two water pumps 400 may be installed.

That is, the valve mounting portion 110 is formed in the center of the valve housing 100 such that the valve 300 is mounted therein, and pump mounting portions 130 are formed at opposite sides of the valve mounting portion 110, whereby the water pumps 400 are provided respectively at the pump mounting portions 130. In particular, since the inner space S1 of the valve mounting portion 110 and the mounting space S2 of the pump mounting portion 130 are formed so as to be open in the horizontal direction, the valve 300 and the water pump 400 are mounted at the valve housing 100 in the horizontal direction, whereby installation convenience is secured.

Here, the plurality of distribution channels 120 of the valve housing 100 extends such that the inner space S1 and the mounting space S2 communicate with each other. As the distribution channels 120 extend so as to pass through the inner space S1 of the valve mounting portion 110 and the mounting space S2 of the pump mounting portion 130, as described above, the cooling medium that has passed through the valve 300 from the reservoir tank 200 may enter the distribution channels 120 by operation of the water pump 400.

The plurality of distribution channels 120 connected to the respective pass-through channels 111 is branched for each port 140 by a partition 150 formed in the mounting space S2 of the valve housing 100. As shown in FIG. 3, the partition 150, which defines the distribution channels 120, extends in the valve housing 100, and the partition 150 defines a distribution channel 120 communicating with a specific pass-through channel 111 of the valve mounting portion 110 and a specific port 140, whereby the cooling medium may be distributed separately through the respective distribution channels 120.

Meanwhile, the valve housing 100 is provided with ports 140 formed respectively at the plurality of distribution channels 120, and the ports 140 may be formed at the distribution channels 120 on the mounting space S2 side. That is, a pipe of a part necessary to be cooled is connected to the port 140, and the port is formed at the distribution channel 120 such that the cooling medium distributed through the distribution channel 120 may be distributed to other parts necessary to be cooled.

As can be seen from FIG. 3, the port 140 may formed so as to extend from the distribution channel 120 of the valve housing 100 in the horizontal direction. In addition, as shown in FIG. 5, the port 140 may be formed so as to extend from the distribution channel 120 of the valve housing 100 in a lateral direction. This may be selectively determined depending on the connection direction of a part or a pipe near the valve housing 100.

In particular, since the port 140 is formed at the distribution channel 120 on the mounting space S2 side, the cooling medium distributed by operation of the water pump 400 may be smoothly discharged through the port 140. In addition, since the port 140 is capable of being freely located on the distribution channel 120 on the mounting space S2 side, it is possible to optimize the connection portion of the pipe.

Meanwhile, the valve mounting portion 110 is provided with a sealing portion 160 formed at an outer circumferential surface of the valve 300. The position of the sealing portion 160 is fixed in the state in which the sealing portion is inserted into the inner space S1, whereby the valve 300 is rotated relative to the sealing portion 160.

The sealing portion 160 is provided between the outer circumferential surface of the valve 300 and an inner circumferential surface of the valve mounting portion 110 to form a seal between the pass-through channels 111. The sealing portion 160 may be formed in a cylindrical shape, and is configured such that the valve 300 is rotated relative to the sealing portion 160. A flow hole 161, through which the cooling medium is distributed between the valve 300 and the pass-through channels 111, is formed in the sealing portion 160, whereby the flow of the cooling medium is not impeded when the sealing portion 160 forms a seal between the valve 300 and the pass-through channels 111.

Meanwhile, as shown in FIG. 6, each of the inner space S1 of the valve mounting portion 110 and the valve 300 may be divided into a plurality of layers L1 and L2 in the horizontal direction. In addition, the sealing portion 160 is also constituted by a plurality of layers.

As each of the pass-through channels 111 of the valve mounting portion 110, the valve 300, and the sealing portion 160 is constituted by the plurality of layers, as described above, the distribution direction of the cooling medium may be diversified, and the plurality of layers shares a plurality of flow channels 310, whereby six or more flows of the cooling medium may be formed using only six ports. In the following embodiment, the construction in which the layers L1 and L2 are constituted by a first layer L1 and a second layer L2 will be described by way of example.

Specifically, the plurality of pass-through channels 111 extends through the respective layers L1 and L2, and the plurality of pass-through channels 111 is connected to the reservoir tank 200 or the respective distribution channels 120.

Here, the valve 300 is provided with a plurality of flow channels 310 formed for each of the layers L1 and L2, and the flow channels 310 formed at one layer are separated from the flow channels 310 formed at another layer.

In addition, a plurality of body holes 320 communicating with the flow channels 310 is formed at an outer surface of the valve 300, and the body holes 320 for each layer may be offset in a circumferential direction.

That is, the pass-through channels 111 extend so as to include both the first layer L1 and the second layer L2, and the flow channels 310 and the body holes 320 are formed at the valve 300 for each of the layers L1 and L2. As an example, as shown in FIG. 7, which is a sectional view of the valve 300 on the first layer L1 side, the first layer L1 may be constituted by six body holes 320 and three flow channels 310 configured to connect two body holes 320 to each other such that the cooling medium is distributed, and the three flow channels 310 may be constituted by one straight flow channel 310 and two bent flow channels 310. In addition, as shown in FIG. 8, which is a sectional view of the valve 300 on the second layer L2 side, the second layer L2 may be constituted by six body holes 320 and three flow channels 310 configured to connect two body holes 320 to each other such that the cooling medium is distributed, and the three flow channels 310 may be constituted by three bent flow channels 310.

The body holes 320 and the flow channels 310 of the valve 300 are based on one embodiment, and the shape and number thereof may be variously changed. As a result, when a specific body hole 320 matches a corresponding one of the pass-through channels 111 depending on the rotational position of the valve 300, the cooling medium may be distributed through the flow channel 310 connected to the body hole 320.

FIG. 9 is a sectional view of the first layer of the valve mounting portion 110 and the valve 300 according to the embodiment of the present disclosure, and FIG. 10 is a sectional view of the second layer of the valve mounting portion 110 and the valve 300 according to the embodiment of the present disclosure.

FIGS. 9 and 10 are sectional views of the layers at the same rotational angle depending on the rotational position of the valve 300.

In the first layer L1, as shown in FIG. 9, the body holes 320 of the valve 300 are disposed so as to communicate with the pass-through channels 111, whereby the flow of the cooling medium through each flow channel 310 may be implemented.

Also, in the second layer L2, as shown in FIG. 10, the body holes 320 of the valve 300 are closed by the sealing portion 160, whereby distribution of the cooling medium may be blocked.

As described above, the flow of the cooling medium may be diversified depending on the rotational position of the valve 300, and a cooling function may be diversified according to the flow direction of the cooling medium.

The construction of an integrated thermal management system having the cooling medium distribution apparatus according to the present disclosure will be described by way of example. As shown in FIG. 11, the valve 300 is provided with six body holes 320, and a PE IN port 320a is connected to the reservoir tank 200. The PE in port 320a is also connected to a HEX OUT port 320b via the first water pump 400a, an electric part PE, and a heat exchanger 500. A RAD IN port 320c is connected to a RAD OUT port 320d via a radiator Rad. A BATT IN port 320e is connected to the reservoir tank 200. The BATT IN port 320e is also connected to a CHILL OUT port 320f via the second water pump 400b, a battery B, a heater H, and a chiller CL. In this connection state, it is possible to independently control the flow of the cooling medium to the electric part PE, the radiator Rad, and the battery B depending on the rotational position of the valve 300. In addition, various thermal management modes may be implemented based on various flows of the cooling medium through the first layer L1 and the second layer L2.

Meanwhile, in another embodiment of the cooling medium distribution apparatus according to the present disclosure, as shown in FIGS. 12 to 14, a water pump 400 may be installed at a reservoir tank 200, and the water pump 400 may be mounted to an outer surface of a lower part of the reservoir tank 200.

As the water pump 400 is mounted to the reservoir tank 200, as described above, a cooling medium always passes through the reservoir tank 200 during operation of the water pump 400, whereby efficiency in removal of air from the cooling medium is improved. The water pump 400 is disposed at the lowermost end of the reservoir tank 200, whereby the cooling medium introduced through the water pump 400 is immersed in the cooling medium received in the reservoir tank 200, and therefore damage to the water pump 400 due to introduction of air may be prevented.

Meanwhile, the reservoir tank 200 and a valve 300 are mounted to one side of a valve housing 100 in the horizontal direction, and a heat exchanger 500 may be mounted to another side of the valve housing 100 in the horizontal direction.

As the reservoir tank 200, the valve 300, and the heat exchanger 500 are mounted to the valve housing 100 in the horizontal direction, as described above, mounting and management of the reservoir tank 200, the valve 300, and the heat exchanger 500 are simplified.

In addition, the reservoir tank 200, the water pump 400, and the valve 300 are provided at one side of the valve housing 100, and the heat exchanger 500, which performs heat exchange, whereby thermal interference with other parts occurs, is provided at the another side of the valve housing 100. When the reservoir tank 200, the water pump 400, the valve 300, and the heat exchanger 500 are mounted to the valve housing 100, therefore, interference between the parts may be prevented, installation positions may be optimized, and the entire package may be reduced.

Meanwhile, as shown in FIG. 14, the valve housing 100 is divided into the one part 100a and another part 100b. The reservoir tank 200 and a valve mounting portion 110 are coupled to one surface of the one part 100a, and a first distribution channel 120a connected to a pass-through channel 111 is formed at another surface of the one part 100a. A second distribution channel 120b matching the first distribution channel 120a is formed at one surface of the another part 100b, and the heat exchanger 500 is coupled to another surface of the another part 100b so as to communicate with the second distribution channel 120b.

As the valve housing 100 is divided into the one part 100a and the another part 100b, as described above, it is possible to easily form the distribution channel 120 in each part. If a plurality of distribution channels 120 is formed in the valve housing 100, it is difficult to from the distribution channels 120.

Consequently, one surface of the one part 100a is formed such that the reservoir tank 200 and the valve mounting portion 110 are mounted thereto, and the first distribution channel 120a is formed at another surface of the one part 100a. In addition, the second distribution channel 120b matching the first distribution channel 120a is formed at one surface of the another part 100b, and another surface of the another part 100b is formed such that the heat exchanger 500 is mounted thereto. When the one part 100a and the another part 100b, which are separately formed, are coupled to each other in the direction in which the first distribution channel 120a and the second distribution channel 120b face each other, the first distribution channel 120a and the second distribution channel 120b may match each other, whereby a single distribution channel 120, through which the cooling medium is distributed, may be formed. As a result, formability of the distribution channel 120 formed in the valve housing 100 is secured.

As such, when the one part 100a and the another part 100b are coupled to each other, the first distribution channel 120a and the second distribution channel 120b match each other, whereby a single distribution channel 120, which is a cooling medium distribution path, is formed, a port 140 communicating with the cooling medium distribution path may be formed at any one of the one part 100a and the another part 100b. That is, the port 140 is connected to a pipe of a part necessary to be cooled, whereby it is preferable for the port 140 to be a single part such that sealing performance is secured and damage to the connection part is prevented. Consequently, the port 140 is formed at any one of the one part 100a and the another part 100b so as to communicate with the cooling medium distribution path formed as the result of matching between the first distribution channel 120a and the second distribution channel 120b, whereby the cooling medium may be circulated through the port 140.

The cooling medium distribution apparatus having the above structure is configured to be installed in a vehicle. In particular, the cooling medium distribution apparatus may be installed as a compact structure while omitting a plurality of peripheral pipes, and may distribute a coolant to various cooling system parts.

In particular, the reservoir tank 200, the water pump 400, and the heat exchanger 500 are disposed around the valve housing 100, whereby manufacture and management thereof are simplified through assembly thereof in the horizontal direction. In addition, connection through the respective ports 140 is possible without branch pipes, which is very advantageous to modularization of the cooling system parts.

As is apparent from the above description, the present disclosure has an effect in that the cooling medium distribution apparatus having the above structure is configured to be installed in a vehicle. In particular, the cooling medium distribution apparatus may be installed in the vehicle as a compact structure, e.g., by omitting a plurality of peripheral pipes and distributing a coolant to various cooling system parts.

In particular, the reservoir tank, the water pump, and the heat exchanger may be disposed around the valve housing, whereby manufacture and management thereof may be simplified through assembly thereof in the horizontal direction. In addition, connection through the respective ports is possible without branch pipes, which is very advantageous to modularization of the cooling system parts.

Although the present disclosure has been described with reference to the accompanying drawings and the above embodiment(s), the present disclosure is not defined thereby but by the appended claims. Accordingly, it will be apparent to those skilled in the art that various modifications and variations can be made in the present disclosure without departing from the technical idea of the appended claims.

What is claimed is:

1. A cooling medium distribution apparatus comprising:
a valve housing comprising an inner space, a plurality of pass-through channels in communication with the inner space, and a plurality of distribution channels in communication with the respective pass-through channels, the distribution channels being configured to allow a cooling medium to be distributed therethrough;
a reservoir tank mounted to the valve housing so as to be in communication with the pass-through channels or the distribution channels, the reservoir tank being configured to store a cooling medium;
a valve mounted to the valve housing, the valve being configured to provide for a change in a distribution direction of the cooling medium; and
a water pump installed at the valve housing, the water pump being mounted to the valve housing in a horizontal direction,
wherein the valve housing comprises a valve mounting portion having the inner space and a pump mounting portion having a mounting space, in which the water pump is provided, defined therein, the inner space of the valve mounting portion and the mounting space of the pump mounting portion being formed so as to be open in the horizontal direction.

2. The cooling medium distribution apparatus according to claim 1, wherein the reservoir tank is mounted to one side of the valve housing in the horizontal direction, and the water pump is mounted to another side of the valve housing in the horizontal direction, whereby the cooling medium is distributed through the reservoir tank and the water pump via the valve housing.

3. The cooling medium distribution apparatus according to claim 1, wherein the plurality of distribution channels of the valve housing extends such that the inner space and the mounting space communicate with each other.

4. The cooling medium distribution apparatus according to claim 3, wherein the valve housing is provided with ports formed respectively at the plurality of distribution channels, each port being formed at a corresponding one of the distribution channels on a mounting space side.

5. The cooling medium distribution apparatus according to claim 4, wherein the valve housing is provided with a partition configured to branch the distribution channels formed in the mounting space for each port.

6. The cooling medium distribution apparatus according to claim 4, wherein the port is formed at the valve housing so as to extend therefrom in the horizontal direction.

7. The cooling medium distribution apparatus according to claim 4, wherein the port is formed at the valve housing so as to extend therefrom in a lateral direction.

8. The cooling medium distribution apparatus according to claim 1, wherein:

the valve mounting portion is provided with a sealing portion formed at an outer circumferential surface of the valve, and a position of the sealing portion is fixed in a state in which the sealing portion is inserted into the inner space, whereby the valve is rotated relative to the sealing portion.

9. The cooling medium distribution apparatus according to claim 1, wherein:

the valve mounting portion is formed in a cylindrical shape having the inner space from which the plurality of pass-through channels protrudes outwards along a side surface of the inner space, and the pass-through channels extend in a height direction of the inner space.

10. The cooling medium distribution apparatus according to claim 1, wherein each of the inner space of the valve mounting portion and the valve is divided into a plurality of layers in the horizontal direction.

11. The cooling medium distribution apparatus according to claim 10, wherein:

the plurality of pass-through channels extends through the respective layers, and the plurality of pass-through channels is connected to the reservoir tank or the respective distribution channels.

12. The cooling medium distribution apparatus according to claim 10, wherein:

the valve is provided with a plurality of flow channels formed for each of the layers, and the flow channels formed at one layer are separated from the flow channels formed at another layer.

13. The cooling medium distribution apparatus according to claim 12, wherein:

a plurality of body holes communicating with the flow channels is formed at an outer surface of the valve, and the body holes for each layer are offset in a circumferential direction.

14. The cooling medium distribution apparatus according to claim 1, wherein a water pump is installed at the reservoir tank, the water pump being mounted to an outer surface of a lower part of the reservoir tank.

15. The cooling medium distribution apparatus according to claim 1, wherein:

the reservoir tank and the valve are mounted to one side of the valve housing in the horizontal direction, and a heat exchanger is mounted to another side of the valve housing in the horizontal direction.

16. The cooling medium distribution apparatus according to claim 1, wherein:

the valve housing is divided into one part and another part, the reservoir tank and the valve mounting portion are coupled to one surface of the one part while a first distribution channel connected to the pass-through channels is formed at another surface of the one part, and a second distribution channel matching the first distribution channel is formed at one surface of the another part while a heat exchanger is coupled to another surface of the another part so as to communicate with the second distribution channel.

17. The cooling medium distribution apparatus according to claim 16, wherein:

when the one part and the another part are coupled to each other, the first distribution channel and the second distribution channel match each other, whereby a single cooling medium distribution path is formed, and a port communicating with the cooling medium distribution path is formed at any one of the one part and the another part.

18. A vehicle comprising the cooling medium distribution apparatus of claim 1.

19. A cooling medium distribution apparatus comprising:

a valve housing comprising an inner space, a plurality of pass-through channels in communication with the inner space, and a plurality of distribution channels in communication with the respective pass-through channels, the distribution channels being configured to allow a cooling medium to be distributed therethrough;

a reservoir tank mounted to the valve housing so as to be in communication with the pass-through channels or the distribution channels, the reservoir tank being configured to store a cooling medium;

a valve mounted to the valve housing, the valve being configured to provide for a change in a distribution direction of the cooling medium; and a valve mounting portion formed in a cylindrical shape having the inner space from which the plurality of pass-through channels protrudes outwards along a side surface of the inner space, wherein the pass-through channels extend in a height direction of the inner space.

20. A cooling medium distribution apparatus comprising:

a valve housing comprising an inner space, a plurality of pass-through channels in communication with the inner space, and a plurality of distribution channels in communication with the respective pass-through channels, the distribution channels being configured to allow a cooling medium to be distributed therethrough;

a reservoir tank mounted to the valve housing so as to be in communication with the pass-through channels or the distribution channels, the reservoir tank being configured to store a cooling medium; and a valve mounted to the valve housing, the valve being configured to provide for a change in a distribution direction of the cooling medium, wherein the reservoir tank and the valve are mounted to one side of the valve housing in a horizontal direction, and wherein a heat exchanger is mounted to another side of the valve housing in the horizontal direction.

* * * * *